Figure 1:
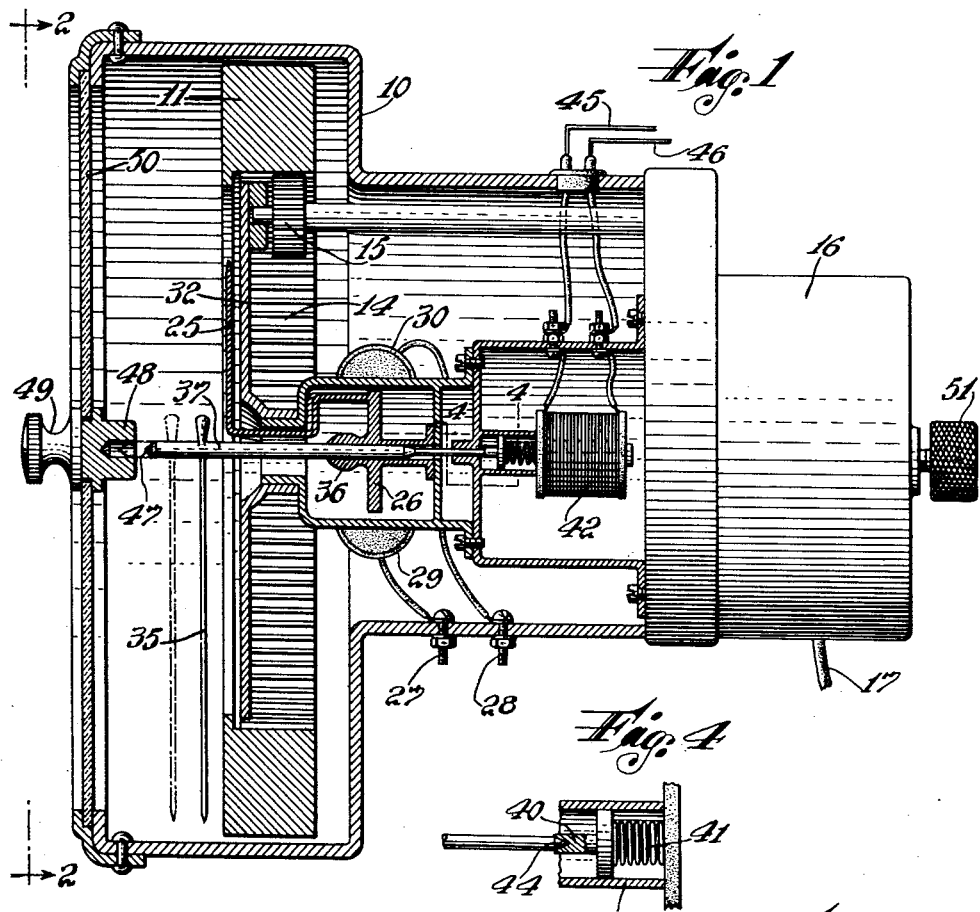

Aug. 3, 1954     J. E. SAUL, SR     2,685,198

FUEL EFFICIENCY INDICATOR

Filed Feb. 27, 1953

INVENTOR.

JOHN E. SAUL, SR.

BY

ATTORNEY

Patented Aug. 3, 1954

2,685,198

UNITED STATES PATENT OFFICE 2,685,198

FUEL EFFICIENCY INDICATOR

John E. Saul, Sr., South Orange, N. J., assignor to Howard W. Saul, Paramus, N. J.

Application February 27, 1953, Serial No. 339,214

5 Claims. (Cl. 73—113)

This invention relates to measuring instruments and more particularly to an instrument for measurement of "actual" against "normal" or desired fuel consumption, thereby providing a visual aid for accurately checking the efficiency of performance of the motor in operation.

The invention may be applied to a motor without making any alteration in the motor itself, or may be built into the control panel associated with said motor, or may be made as a portable unit for rapid connection to the motor to be tested. The instrument may be mounted, for example, on a test console to be used by maintenance and servicemen as a rapid method of determining fuel efficiency without making fuel line connections. It avoids objections present in other types of meters—for example, flowmeters, which are costly and necessitate breaking into the fuel line, adding resistance to the flow plus creating danger of leakage. Further, in the flowmeter type of instrument, there is no standard for comparison.

In the instrument of this invention, efficiency of performance is indicated by a needle movable, responsive to actual fuel consumption, across a scale bearing calibrated markings indicating normal or desired power output for fuel consumption for given periods of time of actual operation of the motor.

Thus, the scale, which indicates normal fuel consumption, may be calibrated for example to bear percentage or units of fuel consumption markings, so that, by observing the position of the needle on that scale one may readily determine the degree to which the actual fuel consumption of the vehicle corresponds with the desired or normal fuel consumption.

The invention is designed to further provide a relatively foolproof measuring instrument which may be built in as original equipment, may be installed as supplementary or extra equipment, or used as a testing unit separate and apart from the motor apparatus.

The instrument provides a rapid and accurate means for indicating that there is something amiss in the system, thereby preventing a situation of progressive deterioration of inefficiency from continuing to a time when serious damage may result. Thus the instrument will provide an important preventative, indicating potential trouble practically as soon as the source thereof is initiated.

Figure 4:
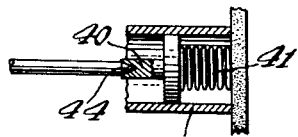
Figure 2:
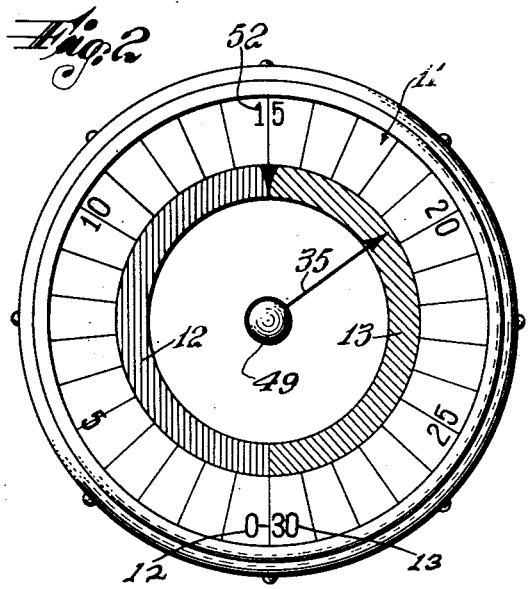
Figure 3:
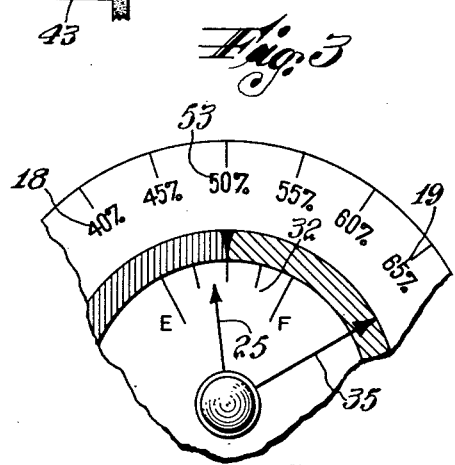

In the drawings:

Fig. 1 is a vertical sectional view of a measuring instrument embodying the invention, Fig. 2 is a front elevational view thereof, taken on line 2—2 of Fig. 1, Fig. 3 is a similar (but fragmentary) view, showing the scale bearing the calibration markings for indicating normal fuel consumption in percentage units as distinguished from whole unit markings shown in Fig. 2 and Fig. 4 is an enlarged fragmentary view, taken on line 4—4 of Fig. 1.

As shown in the drawings, the instrument of my invention may be contained within the housing 10 of any suitable outline, provided with a movable scale 11 having markings thereon such as, for example, quantity markings 12—13 (Fig. 2) which might, for example, be calibrated to indicate normal power output for one complete rotation of scale 11—for example, miles per gallon, or the percentage of normal power output for one complete rotation of scale 11, as shown at 18—19, Fig. 3. Scale 11 may be driven in one direction, as, for example, counterclockwise, by means such as the gear means 14, 15 connected to a time-interval works such as 16. Timer 16, in turn, would preferably be connected to the electrical circuit controlling the motor whose fuel consumption is to be measured, by any suitable means such as the cable 17, whereby the timer 16 would be energized only at such times as the motor to be tested by scale 11 is likewise energized. Markings such as "0-30" on scale 11 may be used to indicate, for example, the normal or estimated power output for a given time interval of operation of the motor—for example, for a 2-hour interval of time under normal operating conditions. Instead of the power output unit markings "0-30" (which might mean miles per gallon), the scale 11 may have percentage markings, such as, for example, fragmentarily shown at 18—19 in Fig. 3, to indicate percentages of normal output for consumption of units of fuel during the time interval of rotation of scale 11. Thus, for example, if the scale 11 in Fig. 2 is calibrated to indicate a rate of 30 miles or other output units for the fuel consumed during one complete rotation of the scale 11 for the predetermined time interval, then the percentage markings 18—19 of Fig. 3 would indicate percentagewise efficiency of operation, likewise reflected by the quantity of fuel consumed during the passage of that time interval, as presently more fully explained.

The markings 12—13, 18—19, or the like on scale 11 in the instrument of my invention, are of the following significance:

A fuel quantity rotor hub 26 is provided and rotated responsive to the consumption of fuel by the motor, preferably in the same direction as scale 11. Hub 26 is part of the electrical system connected to the fuel tank of the motor to be tested, as by the wires from terminals 27, 28, said terminals being also connected to the balance coil wires 29, 30, so that, as fuel is progressively consumed by the motor, hub 26 will be correspondingly rotated (in the same direction as scale 11).

The terminals 27, 28 are preferably cut into the electrical circuit for the motor so that when the latter is closed, the electrical connection between the terminals 27, 28 and the fuel tank will be completed. However, it will be appreciated that there may be a lapse of time between the completion of the electrical circuit and actual operation of the motor. A fuel consumption needle 35 is provided, to be rotated responsive to fuel consumption, as, for example, by providing an extended end 36 on the hub 26 which has friction-sliding contact with the shaft 37 of needle 35.

Pursuant to the invention, there is also provided means for disengaging the shaft 37 of needle 35 from hub end 36. As shown in Fig. 4, the means may be such as to normally hold the needle 35 disengaged from hub end 36. In the form shown in Figs. 1 and 4, this means comprises a bearing 40 secured to the free end of spring 41 whose other end is fixed to a stationary part such as the top of electromagnet 42. The bearing 40 is adapted to reciprocate responsive to the spring 41 in an open housing 43 positioned on electromagnet 42. The lower end 44 of the needle may be pointed, the bearing 40 being preferably correspondingly recessed, as shown in Fig. 4, so that the needle may rotate unimpaired on the non-rotatable bearing 40. The shaft 37 of the needle is preferably made of metal so that the lower end thereof will be attracted to electromagnet 42 when connected to the circuit for the motor by wires 45, 46. A further feature of the invention is the energizing of electromagnet 42 only during actual operation of the motor. To that end, wires 45, 46 are preferably connected to a vacuum-actuated switch or solenoid which is actuated responsive to a vacuum force exerted by the "operating" motor; any other mechanism operative only on actual operation of the motor may be interposed between the electromagnet 42 and the motor circuit, whereby electromagnet 42 will be energized only when the motor is in actual operation. As a result of such arrangement, needle shaft 37 will be drawn downwardly against the tension of the spring 41 and to the approximate position of the parts shown in full lines in Figs. 1 and 4 only when the motor is in actual operation. Otherwise, when electromagnet 42 is not energized, spring 41 will urge the needle 37 away from electromagnet 42 so that the free upper end 47 of the needle 35 will impinge against stop member 48, preventing rotation of needle 35 during rotation of rotor 25. By this arrangement, for example, when the rotor 25 rotates, for example, on filling the fuel tank, or on shutting of the motor, fuel consumption needle 35 will be held against rotation.

In the particular form of the scale 11 shown in Figs. 2 and 3, there are color marking bands 12, 13 on said scale (red and green for example) which would indicate, if the needle 35 were in the red region 12, that the rate of fuel consumption was too great, whereas, if it were in the "green" section 13, that would indicate that the rate of fuel consumption was good. This would provide a broad "spot check" on scale 11. Where percentage scale markings, such as shown at "18—19" in Fig. 3, are used, the position of needle 35 immediately indicates a rate of percentage of efficiency of the motor from a fuel consumption standpoint. If the markings "12—13" of scale 11 of Fig. 2 are calculated on units of output per units of fuel consumed, as, for example, miles per gallon of fuel consumed, the observer may readily note the rate of yield of miles per gallon as marked by fuel consumption needle 35 on time interval scale 11 at any time during the 360 degree rotation of the scale 11.

It will be noted that scale 11 rotates responsive to time periods of operation of the fuel-consuming motor being measured—for example, counter-clockwise. Needle 35 rotates in the same direction responsive to fuel consumption in the fuel tank as reflected by rotation of hub 26 driving needle 35 in one direction only. The needle 35 is held against the stop 48 responsive to action of spring 41 and inactivity of electromagnet 42 while the fuel consuming motor is not operated—for example, while the fuel reservoir is being refilled. Thus rotation of hub 26 clockwise, i. e., counter to its direction of rotation responsive to fuel consumption, in reflecting the fuel refilling operation, would not correspondingly rotate needle 35. The same objective is attained by the delay in releasing needle 35 from hub 48 until the motor is in actual operation as reflected by electrical connections 45, 46, to a switch operated only by actual operation of the motor. In place of uni-directional means 42, 41, 48, hub 26 and needle 35 may have other uni-directional driving means as will be apparent from the present description of the invention, such other forms shall be deemed within the spirit and scope of the invention.

The stop 48 may be secured to a reset knob 49 so that fuel consumption needle 35 may be reset by the user from time to time; housing 10 may be provided with a transparent face 50 to facilitate reading the instrument there through. Timer motor 16 may be provided with a reset knob such as 51.

It will be appreciated from the foregoing description that the instrument of this invention may be manufactured in many different forms.

In using the instrument, the fuel consumption needle 35 may, for example, be initially set so as to register that marking on scale 11, which indicates average rate of unit output efficiency as reflected in the fuel consumption of the motor in question. Scale 11 may be marked as predetermined for the purpose. As the scale 11 rotates responsive to passage of time, if the fuel consumption needle 35 keeps pace with that rotation responsive to rotor hub 26 rotating synchronously with or more slowly than scale 11 as the fuel is consumed at the "average" rate, the observer would note that consumption is normal. On the other hand, if the needle 35 rotates more rapidly than the scale 11, due to a more rapid consumption of fuel, then the needle 35 will indicate on the scale 11 a lesser efficiency—a lesser number of miles, for example, covered per unit of fuel consumed. Likewise, it will be noted that the color arcs 12, 13 on scale 11 would enable one to tell at a glance whether the needle 35 is in the "good" range of between 50% and 100% efficiency as in Figs. 2 and 3 or in the "bad" "red" region 12 of scale 11, which is the region between fifty percent and zero efficiency, indicating that the motor is consuming a greater than normal amount of fuel due to some condition which should be promptly remedied. The fuel hub 26 may have fixed thereto a fuel quantity pointer 25 movable across a fixed scale 32 marked with numbers of unit-of-fuel in the tank noted by the position of point 25 between "E and F" markings as shown in Fig. 3.

From the foregoing, it will be apparent that the measuring instrument of my invention provides a continuously visible means for determining engine fuel efficiency, without reference to charts or graphs. The instrument continuously operates during the operation of the engine with which it is associated and does not require resetting at all, unless it is desired to reset the same after the cause of engine inefficiency has been corrected, for example.

The term "normal" in the specification refers to predetermined or selected standard conditions relative to which the scale 11 is calibrated for a given period of operation. As conditions of operation vary, it is not intended to imply that merely operating an indicator dial by a constant speed device would produce the continuous normal operating characteristics of an engine under all conditions.

Having thus described my invention, what I claim as new and desire to secure by Letters Patent is:

1. A measuring instrument for measurement of actual against predicted normal fuel consumption of a motor for different periods of operation of the motor, comprising a rotatable scale, means for driving said scale at constant speed based on time intervals of motor operation, calibration markings thereon for indicating the said predicted normal rate of fuel consumption of the motor, a needle mounted on a shaft coaxial with the axis of rotation of said scale and movable responsive to the fuel consumption of the engine for said time intervals of its operation, both the scale and needle being movable in the same direction, relative movement between the scale and needle in the same direction being indicative of deviation free from the predicted normal rate.

2. In a measuring instrument as set forth in claim 1, an electromagnet axially aligned with the needle shaft, and clutching means interposed axially intermediate the said shaft and electromagnet for moving said needle axially away from the electromagnet and to an inoperative position when the electromagnet is not energized.

3. In a measuring instrument as set forth in claim 1, means urging said needle in one axial direction to an inoperative position and electromagnetic means for moving said needle in opposite axial direction to an operative position responsive to and during periods of operation of said motor.

4. In a measuring instrument as set forth in claim 1, balance coils electrically connected to the fuel reservoir to set up an electrical field on changes in the level of fuel in said reservoir, a hub frictionally connected to said needle shaft, said hub being axially rotatably disposed centrally of the balance coils so as to be rotated thereby responsive to such changes.

5. In a measuring instrument as set forth in claim 1, said means for driving said movable scale including an electric clock mechanism connected to the motor operating electrical circuit and thereby energized only on operation of said motor.

References Cited in the file of this patent

UNITED STATES PATENTS

| Number | Name | Date |
| --- | --- | --- |
| 1,914,946 | Glick | June 20, 1933 |
| 2,505,237 | Dwyer | Apr. 25, 1950 |